Nov. 30, 1926.
J. C. BAINE
1,609,009
SPOTLIGHT EQUIPPED BICYCLE
Filed March 27, 1925
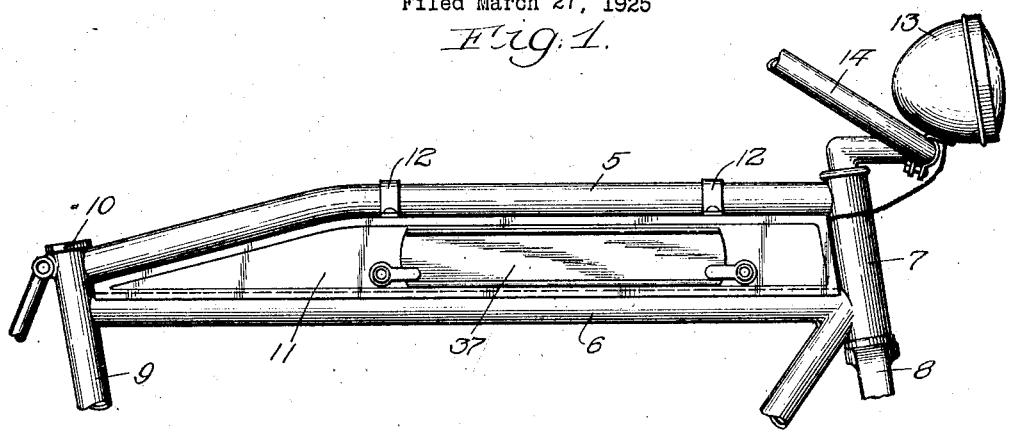
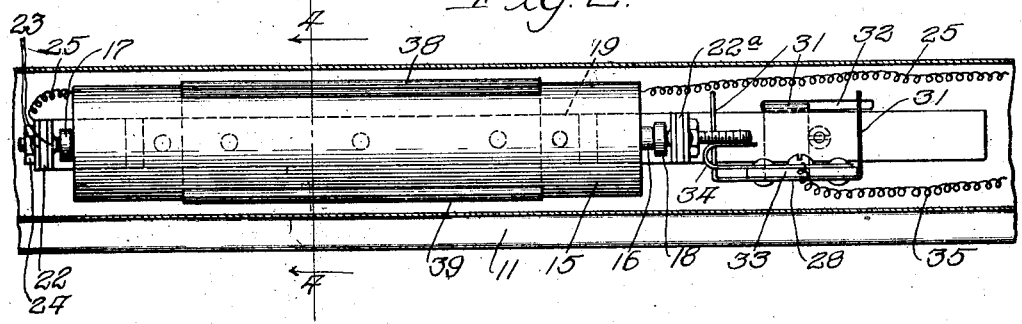
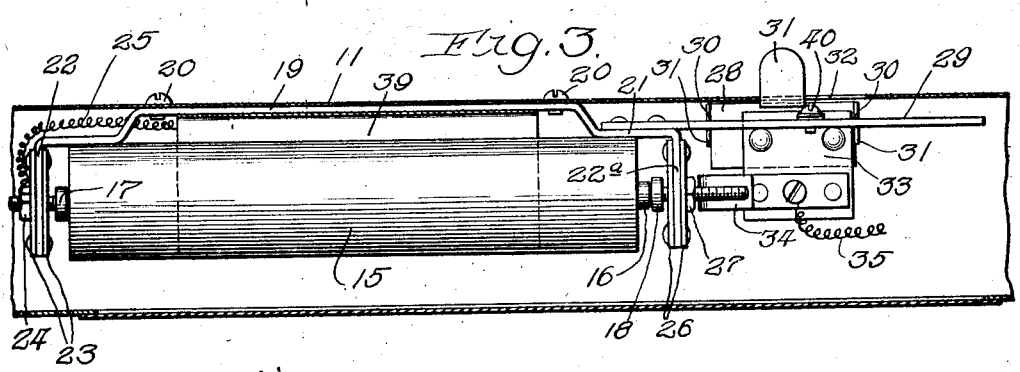
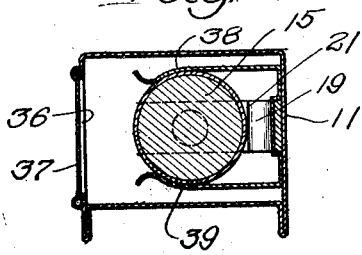
Inventor:
James C. Baine, Patented Nov. 30, 1926.

1,609,009

UNITED STATES PATENT OFFICE.

JAMES C. BAINE, OF MICHIGAN CITY, INDIANA.

SPOTLIGHT-EQUIPPED BICYCLE.

Application filed March 27, 1925. Serial No. 18,709.

My invention relates to spot lights for bicycles, and more especially to spot lights for bicycles of the variety known as motor-bikes which are provided beneath the upper cross bars thereof with receptacles simulating as to their general form and location, the gasoline tanks as commonly provided on motorcycles.

Certain of my objects are to provide for the use of a battery of the common flashlight type with its terminals unprovided with binding posts, as the source of energy of a spot light on a bicycle; to provide for the location of the switch controlling the spot light at a readily accessible place on the bicycle; to provide a construction wherein the battery for the spot light is housed in a receptacle located beneath the upper cross bar of the bicycle frame, and of such proportions as to present a neat appearance, simulate the gasoline tank as commonly provided on motor-bikes, and be properly proportioned relative to the other parts of the bicycle for producing the desired symmetry.

Referring to the accompanying drawings:

Figure 1 is a view in side elevation of the upper portion of a motor-bike equipped with my improvements and comprising a battery-housing receptacle located between the spaced-apart upper cross bars of the frame of the motor-bike. Figure 2 is a broken view in longitudinal elevation of the receptacle above referred to, showing the parts therein in elevation. Figure 3 is a broken plan view of the structure shown in Fig. 2; and Figure 4, a section taken at the line 4—4 on Fig. 2 and viewed in the direction of the arrows.

The bicycle structure shown, and of the motor-bike type, may be of any desired construction, such as is commonly provided, that shown comprising the usual motor-bike frame formed with two vertically spaced-apart upper cross bars 5 and 6 connected at their forward ends with the tubular head portion 7 in which the front steering fork structure 8 is journaled, and at their rear ends with the tubular frame member 9 at which the seat post 10 of the bicycle is supported.

Located in the space between the cross bars 5 and 6 is a receptacle 11, preferably formed of sheet metal and of such shape as to fairly snugly fit the space between these bars, and of relatively narrow width, this receptacle being shown as secured in place by clips 12 connected therewith and straddling the upper cross bar 5.

The receptacle 11 which thus simulates the gasoline tank commonly provided at a corresponding location in motor-cycles, houses electrical contacts and switch mechanism for co-operation with a battery, hereinafter referred to, introduced into the receptacle, said contacts being electrically connected with a spot light represented at 13, which may be of any suitable construction, as for example any one of those commonly used, and adapted to be secured to the bicycle, at any desired location, as for example, to the handle bar 14, as shown in Fig. 1.

In accordance with the particular illustrated embodiment of my invention the contacts above referred to and located in the receptacle are provided of such form and are so arranged as to be electrically contacted with the terminals of a battery of the flashlight type and represented at 15, such type of battery, as is well understood in the art, being unprovided with binding posts and commonly presenting at one end an exposed portion of the tubular metal terminal of the battery, and at its other end the stub extension 16 of the other, inner, terminal of the battery. The contacts referred to are represented at 17 and 18 and are shown as supported on a bar 19 located in the receptacle 11 and extending lengthwise thereof and secured thereto by screws 20, the ends of the bar 19 being bent to present the offset portions 21 terminating in angularly disposed plate portions 22 and 22ª shown as extending substantially parallel with each other and crosswise of the receptacle 11. The contact 17, which is shown as formed of a screw, has threaded engagement with aligning openings in plates 23 of insulating material located at opposite sides of, and secured to, the plate portion 22, the screw 17 passing through an opening (not shown) in the plate portion 22 and out of contact with the walls thereof, and the screw 17 carrying a nut 24 which serves as a means of holding the screw 17 in adjusted position and clamping a wire 25 in electrical contact with the screw 17, this wire extending to one of the terminals of the lamp socket of the spot light 13.

The other contact 18 is carried by the plate portion 22ª in the same way that the contact 17 is carried by the plate portion 22, the insulating plates and the clamping nut being represented at 26 and 27, respectively.

The switch device above referred to and located in the receptacle 11, is shown as comprising a yoke member 28 reciprocable lengthwise of the housing 11, on a bar 29 secured to the bar 19, the bar 29 extending through openings 30 in the arms 31 of the yoke 28 to adapt the yoke for guiding movement on the bar. The yoke is provided with a lug 31 which extends outwardly through a slot 32 in the side wall of the receptacle 11 and by which the yoke may be slid along the bar 29 by the operator. The base portion of the yoke 28 is connected with a plate 33 of insulating material to which a spring contact member 34 is rigidly connected, the member 34 extending into such position that in its movement to the left in Figs. 2 and 3 to the position therein shown, it engages with the contact 18, and when moved to the right in these figures, disengages from this contact. The contact member 34 is connected with one end of a wire 35 which leads to the other terminal of the socket of the spot light 13.

As means for preventing accidental movement of the switch member carrying the contact 34 out of the position to which it is shifted by the operator, either to open or close the circuit, I provide a projection 40 on the bar 29 which is so positioned that the vertical portion of the lug 31 rubs against it in moving to either of the extreme positions occupied by the switch member referred to, and when this switch member reaches either of its extreme positions, the lug 31 will pass the high point of the projection 40 and spring inwardly, as shown in Fig. 3, thereby producing a yielding interlock between the lug 31 and the projection which holds this switch member against accidental displacement.

The parts described are so arranged, that upon introducing the battery 15 into the receptacle 11 through an opening 36 in a side wall thereof and equipped with a hinged closure 37, the battery will be caused to engage at its terminal portions with the contacts 17 and 18, respectively, and form the desired electrical connections therebetween, the battery being centered in place by spring clips 38 and 39 carried by a side wall of the receptacle 11, the battery bearing laterally against the deflected portions 21 of the bar 19.

It will be understood from the foregoing that the feature of providing a construction adapted for the use of a battery of the flashlight type, presents many advantages over the use of the ordinary relatively large dry cells as commonly used, not only because the receptacle may be provided of smaller dimensions than hitherto possible and permitting of the provision of the receptacle of such size that the appearance of the bicycle in general is greatly improved, but also because of the ease of the removal and replacement of the battery and of its procurement from a wide variety of dealers, such type of batteries being sold by many dealers in addition to those carrying the ordinary form of dry cells.

The feature of mounting the switch controlling the spot light on the receptacle is of advantage inasmuch as it renders it much more accessible to the rider, and simplifies the construction.

While I have illustrated and described a particular construction embodying my invention, I do not wish to be understood as intending to limit it thereto, as the same may be variously modified and altered without departing from the spirit of my invention.

What I claim as new, and desire to secure by Letters Patent is:

A battery unit comprising a relatively attenuated receptacle shaped for substantially horizontal disposition and fastening against a cross bar of a bicycle, a U-shaped bar in said receptacle having angularly disposed ends, terminals carried by said ends for engagement with those of the battery through lateral sliding movement of the latter, a clip in said receptacle to guide the battery during said movement, said receptacle having an opening to permit removal and replacement of the batteries, a bar forming a forward extension of the first mentioned bar, and a switch operable from the exterior of the receptacle and carried by the second mentioned bar, said switch being in operative relation to said terminals.

JAMES C. BAINE.